US009815956B2

(12) United States Patent  
Shima

(10) Patent No.: US 9,815,956 B2  
(45) Date of Patent: Nov. 14, 2017

(54) EXPANDABLE COMPOSITE RESIN BEAD

(71) Applicant: JSP CORPORATION, Chiyoda-ku (JP)

(72) Inventor: Masaomi Shima, Mie (JP)

(73) Assignee: JSP CORPORATION, Chiyoda-ku (JP)

( * ) Notice: Subject to any disclaimer, the term of this patent is extended or adjusted under 35 U.S.C. 154(b) by 145 days.

(21) Appl. No.: 14/824,564

(22) Filed: Aug. 12, 2015

(65) Prior Publication Data

US 2016/0053068 A1  Feb. 25, 2016

(30) Foreign Application Priority Data

Aug. 20, 2014 (JP) .................. 2014-167389

(51) Int. Cl.
| | | |
|---|---|---|
| *C08J 9/14* | (2006.01) | |
| *C08J 9/22* | (2006.01) | |
| *C08J 9/16* | (2006.01) | |
| *C08J 9/232* | (2006.01) | |

(52) U.S. Cl.
CPC . C08J 9/22 (2013.01); C08J 9/16 (2013.01); C08J 9/232 (2013.01); *C08J 9/141* (2013.01); *C08J 2203/14* (2013.01); *C08J 2351/06* (2013.01)

(58) Field of Classification Search
CPC ....... C08J 9/16; C08J 9/22; C08J 9/232; C08J 2203/14; C08J 2351/06; C08J 9/141  
See application file for complete search history.

(56) References Cited

U.S. PATENT DOCUMENTS

| | | | |
|---|---|---|---|
| 9,000,060 B2 | 4/2015 | Shima | |
| 9,309,398 B2* | 4/2016 | Shima | ...................... C08J 9/228 |
| 2012/0149792 A1 | 6/2012 | Shima | |
| 2014/0221517 A1 | 8/2014 | Shima et al. | |
| 2015/0105483 A1 | 4/2015 | Shima | |

FOREIGN PATENT DOCUMENTS

| | | | |
|---|---|---|---|
| JP | 4502234 | | 7/2010 |
| JP | 5138254 | | 2/2013 |
| JP | 5345329 | | 11/2013 |
| WO | WO 2007/099833 A1 | | 9/2007 |
| WO | WO2013031417 | * | 3/2013 |

* cited by examiner

*Primary Examiner* — Irina S Zemel  
(74) *Attorney, Agent, or Firm* — Oblon, McClelland, Maier & Neustadt, L.L.P.

(57) ABSTRACT

An expandable composite resin bead containing an organic physical blowing agent and a base resin composed of a composite resin obtained by polymerizing a styrene monomer in a polypropylene resin. The styrene monomer is polymerized in an amount of more than 400 parts by mass and not more than 1900 parts by mass with respect to 100 parts by mass of the polypropylene resin. The composite resin contains xylene solubles to be obtained through xylene solvent Soxhlet extraction of the expandable composite resin bead, the xylene solubles contain acetone solubles to be obtained through dissolution of the xylene solubles into acetone, and the acetone solubles have an absorbance ratio A ($D_{698}/D_{1376}$) of an absorbance $D_{698}$ to an absorbance $D_{1376}$ that are respectively measured at a wavenumber of 698 $cm^{-1}$ and 1376 $cm^{-1}$ as infrared absorption spectra of the acetone solubles within a range of from 8.5 to 23.

20 Claims, 2 Drawing Sheets

EXPANDABLE COMPOSITE RESIN BEAD

CROSS-REFERENCE

This application claims priority to Japanese patent application no. 2014-167389 filed on Aug. 20, 2014, the contents of which are entirely incorporated herein by reference.

BACKGROUND OF THE INVENTION

Field of the Invention

The present invention relates to an expandable composite resin bead containing an organic physical blowing agent and a base resin composed of a composite resin obtained by polymerizing a styrene monomer in a polypropylene resin.

Description of the Related Art

A foamed resin molded article formed from expanded beads obtained through in-mold molding and mutual fusion-bonding of the expanded beads is widely used in applications such as for wrapping materials, building materials, impact absorbing materials, and the like, by utilizing excellent properties of the foamed resin molded article including buffering property, lightweightness, thermal insulation property, and the like. As the foamed resin molded article, those whose base resin materials include a polyolefin resin such as polypropylene and polyethylene or a polystyrene resin such as polystyrene are used. An expanded bead is obtained by foaming and expanding an expandable resin bead containing a blowing agent, and an expandable resin bead containing a desired base resin is used.

When compared to a foamed polystyrene resin molded article formed from the expanded beads, a foamed polyolefin resin molded article formed from the expanded beads has excellent impact resistance, toughness, and post-compression restorability, and is therefore used as packaging materials and wrapping materials for precision components and heavy weight products etc. Furthermore, the foamed polyolefin resin molded article also has excellent heat resistance and oil resistance, and is therefore also used as automobile components such as impact absorbers, bumpers, and floor spacers. However, although the foamed polyolefin resin molded article has excellent characteristics as described above, the foamed polyolefin resin molded article also has shortcomings including having low rigidity and requiring equipment such as special metal molds since the steam temperature upon in-mold molding is high, when compared to the foamed polystyrene resin molded article.

On the other hand, when compared to the foamed polyolefin resin molded article, the foamed polystyrene resin molded article is generally moderate in price, has low molding vapor pressure upon in-mold molding, and has fine processability, and is therefore widely used in the market. Furthermore, the foamed polystyrene resin molded article has excellent rigidity, and enables a high expansion ratio depending on the application. Thus, when compared to the foamed polyolefin resin molded article, the foamed polystyrene resin molded article is also advantageous in terms of lightweightness.

However, when compared to the foamed polyolefin resin molded article, the foamed polystyrene resin molded article also has shortcomings such as having inferior toughness and post-compression restorability.

In order to resolve shortcomings of the both types of molded articles, for example, the following techniques have been developed. More specifically, an expanded bead containing a composite resin obtained by impregnating a polypropylene resin bead with a vinyl monomer and polymerizing the vinyl monomer has been developed (see Japanese Patent No. 4502234, Japanese Patent No. 5138254, Japanese Patent No. 5345329 and International Publication No. WO2007/099833). In Japanese Patent No. 4502234, an expanded bead containing 60 to 95% by weight of a polypropylene resin and 5 to 40% by weight of a polymer of a vinyl monomer is proposed. In Japanese Patent Nos. 5138254 and 5345329, an expanded bead containing 20 to 50% by weight of a polypropylene resin and 50 to 80% by weight of a polymer of a vinyl monomer is proposed. Besides, in International Publication No. WO2007/099833, an expanded bead containing 14.3 to 76.9% by weight of a polypropylene resin and 23.1 to 85.7% by weight of a polymer of a vinyl monomer is proposed.

The expanded bead described in Japanese Patent No. 4502234 still has, however, room for improvement in the rigidity of a molded article because a proportion of the polypropylene resin in the composite resin is high. Furthermore, the expanded beads of Japanese Patent Nos. 5138254 and 5345329 and International Publication No. WO2007/099833 still have room for improvement in the restorability because if the content of the polymer of the vinyl monomer is large, a molded article having excellent rigidity can be produced but the compression set of the molded article is large.

The present invention has been made in view of such a background, and provides an expandable composite resin bead having excellent expandability from which a composite resin expanded bead and a foamed resin molded article excellent in both rigidity and post-compression restorability can be obtained.

SUMMARY OF THE INVENTION

One aspect of the present invention is an expandable composite resin bead containing:

a base resin composed of a composite resin obtained by polymerizing a styrene monomer in a polypropylene resin; and an organic physical blowing agent, wherein the styrene monomer is polymerized in an amount of more than 400 parts by mass and not more than 1900 parts by mass with respect to 100 parts by mass of the polypropylene resin, the composite resin contains xylene solubles to be obtained through xylene solvent Soxhlet extraction of the expandable composite resin bead, the xylene solubles contain acetone solubles to be obtained through dissolution of the xylene solubles into acetone, and the acetone solubles have an absorbance ratio A ($D_{698}/D_{1376}$) of an absorbance $D_{698}$ to an absorbance $D_{1376}$ that are respectively measured at a wavenumber of 698 cm$^{-1}$ and at a wavenumber of 1376 cm$^{-1}$ as infrared absorption spectra of acetone solubles within a range of from 8.5 to 23.

The expandable composite resin bead contains the composite resin obtained by polymerizing a styrene monomer in a polypropylene resin (hereinafter appropriately designated as the "PP resin"), and the amount of the styrene monomer with respect to the amount of the PP resin is high as described above. Therefore, by using the expandable composite resin bead, a composite resin expanded bead and a foamed resin molded article excellent in rigidity can be obtained owing to excellent characteristics of a styrene polymer derived from the styrene monomer. Besides, in the expandable composite resin bead, the absorbance ratio A of the acetone solubles falls in the prescribed range. Therefore, the composite resin expanded bead and the foamed resin molded article obtained by using the expandable composite resin bead can exhibit excellent post-compression restorability while having excellent rigidity derived from the characteristics of the styrene polymer. Furthermore, the expandable composite resin bead is also excellent in blowing agent retainability and expandability.

DESCRIPTION OF THE PREFERRED EMBODIMENTS

Figure 1:
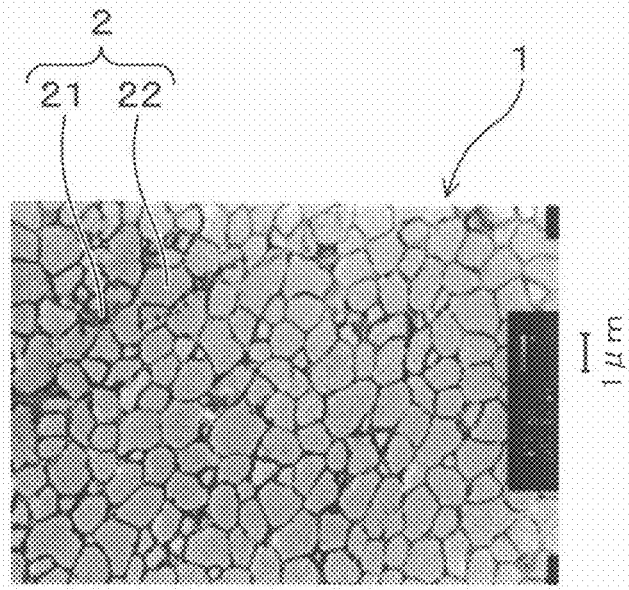
FIG. 1 shows a transmission electron micrograph in a cross section of a central part of an expandable composite resin bead according to Example 1.

Preferable embodiments of the expandable composite resin bead will now be described.

The expandable composite resin bead contains a composite resin obtained by polymerizing a styrene monomer in a PP resin. The expandable composite resin bead further contains an organic physical blowing agent, so that a composite resin expanded bead can be produced by expanding (foaming and expanding) the expandable composite resin bead by heating or the like. Besides, a foamed resin molded article (a molded article formed from the composite resin expanded beads) can be produced by fusion-bonding a plurality of composite resin expanded beads to one another in a mold to be molded into a desired shape (i.e., by in-mold molding).

In general, in an expanded bead and a molded article of the expanded bead containing, as a base resin, a composite resin obtained by polymerizing a styrene monomer in a PP resin, when the mixing ratio of the styrene monomer is increased, rigidity is improved but post-compression restorability is lowered. On the other hand, the expandable composite resin bead of the present invention contains the composite resin having the specific absorbance ratio A as described above. Therefore, an expanded bead and a molded article of the expanded bead obtained by using the expandable composite resin bead can be greatly improved in the post-compression restorability while retaining high rigidity attained owing to the increased mixing ratio of the styrene monomer.

The reason why the excellent restorability can be exhibited when the absorbance ratio A falls in the prescribed range is presumed as follows. When a styrene monomer is polymerized in a PP resin, a composite resin containing the PP resin, a polystyrene resin resulting from the polymerization of the styrene monomer (hereinafter appropriately designated as the "PS resin") and a graft copolymer resulting from graft polymerization of the styrene monomer with the PP resin (PP-g-PS resin) is produced. In acetone solubles obtained by dissolving, in acetone, xylene solubles resulting from Soxhlet extraction of the expandable composite resin bead, not only the PS resin but also the PP-g-PS resin having a comparatively long graft chain (PS chain) is contained. In other words, the absorbance ratio A falling in the prescribed range means that the composite resin constituting the expandable composite resin bead includes a large amount of PP-g-PS resin having a comparatively long graft chain. It is presumed that since the composite resin contains a large amount of PP-g-PS resin having a long graft chain, the interfacial adhesion between the PP resin and the PS resin is particularly improved, and since such a composite resin can be properly extended, a foam cell film with high strength is formed after expanding the expandable composite resin bead. Besides, it is presumed that the composite resin expanded bead and the foamed resin molded article obtained by using the expandable composite resin bead can be sufficiently reversibly deformed when compressed because the composite resin shows excellent flexibility. Accordingly, even when the mixing ratio of the styrene monomer is high, the foam cell film is difficult to break and hence a closed cell structure can be retained in the composite resin expanded bead and the foamed resin molded article. This is probably the reason why the composite resin expanded bead and the foamed resin molded article obtained by using the expandable composite resin bead can exhibit not only excellent rigidity but also excellent restorability. In other words, the composite resin expanded bead and the foamed resin molded article obtained by using the expandable composite resin bead having the absorbance ratio A falling in the prescribed range are presumed to be improved in the restorability, and to have rigidity and restorability both at high level even when the mixing ratio of the styrene monomer is high.

When the content of the PS resin in the composite resin is too large, the composite resin expanded bead and the foamed resin molded article obtained by using the expandable composite resin bead may not show sufficient restorability. Accordingly, the mixing ratio of the styrene monomer with respect to 100 parts by mass of the PP resin is preferably 1900 parts by mass or less, more preferably 900 parts by mass or less, and further preferably 700 parts by mass or less. On the other hand, when the content of the PS resin in the composite resin is too small, the composite resin expanded bead and the foamed resin molded article obtained by using the expandable composite resin bead may not show sufficient rigidity. Accordingly, the mixing ratio of the styrene monomer with respect to 100 parts by mass of the PP resin is preferably more than 400 parts by mass, more preferably 450 parts by mass or more, and further preferably 500 parts by mass or more. The mixing ratio of the styrene monomer with respect to the PP resin can be determined by combining any of all the aforementioned preferable ranges, more preferable ranges and further preferable ranges of the upper and lower limits.

Besides, the expandable composite resin bead contains the composite resin in which the content of a polymer derived from the styrene monomer is high as described above. Therefore, the expandable composite resin bead is excellent in the retainability for an organic physical blowing agent such as butane. Accordingly, the storage temperature condition of the expandable composite resin bead can be simplified, and the storable period can be elongated. As a result, the expandable composite resin bead can be stored at, for example, ordinary temperature for a long period of time in a sealed container while sufficiently retaining its expanding force. Accordingly, there is no need to expand the expandable composite resin bead in a short period of time after the production of the expandable composite resin bead, and the expandable composite resin bead can be transported and stored in an unbulky state.

Besides, when a plurality of the expandable composite resin beads are actually stored for a long period of time and then expanded to obtain the composite resin expanded beads, the variation in apparent density of the composite resin expanded beads can be decreased. Furthermore, since the composite resin expanded beads have good in-mold moldability, the foamed resin molded article obtained by the in-mold molding of the composite resin expanded beads is excellent in appearance and fusion-bonding properties among expanded beads.

Composite resin contained in the expandable composite resin bead contains xylene solubles to be obtained through xylene solvent Soxhlet extraction of the expandable composite resin bead, and the xylene solubles contain acetone solubles to be obtained through dissolution of the xylene solubles into acetone. The absorbance ratio A ($D_{698}/D_{1376}$) of the acetone solubles of the expandable composite resin bead is in the range of 8.5 to 23. This absorbance ratio A ($D_{698}/D_{1376}$) is a ratio of an absorbance $D_{698}$ at a wavenumber of 698 cm$^{-1}$ to an absorbance $D_{1376}$ at a wavenumber of 1376 cm$^{-1}$ in infrared absorption spectra. The absorbance $D_{698}$ at a wavenumber of 698 cm$^{-1}$ corresponds to an absorbance derived from the out-of-plane deformation vibration of a benzene ring, and the absorbance $D_{1376}$ at a wavenumber of 1376 cm$^{-1}$ corresponds to an absorbance derived from the symmetric deformation vibration of $CH_3$ contained in the PP resin. In general, acetone solubles of a mixture of polypropylene and polystyrene, which are obtained by the same methods as those of the expandable composite resin bead, do not have an absorbance at a wavenumber of 1376 cm$^{-1}$ in infrared absorption spectra because the polypropylene, that is, the PP resin is insoluble in acetone. When a styrene monomer is graft-polymerized with a PP resin and a graft chain of a PS chain is elongated as described above, the resin becomes soluble in acetone. Accordingly, the absorbance ratio A ($D_{698}/D_{1376}$) having a small value means that the PP-g-PS resin having a long graft chain of a PS chain is contained in a large amount in the composite resin. When the absorbance ratio A of the acetone solubles is too high, the composite resin expanded bead and the foamed resin molded article obtained by using the expandable composite resin bead may not show sufficient restorability. Besides, in this case, the expandability of the expandable composite resin bead may be degraded. This is probably because the content of the PP-g-PS resin having a long graft chain of a PS chain is too small. Accordingly, the absorbance ratio A ($D_{698}/D_{1376}$) of the acetone solubles is preferably 23 or less, more preferably 18 or less, and further preferably 15 or less.

On the other hand, when the absorbance ratio A of the acetone solubles is too low, the composite resin expanded bead and the foamed resin molded article obtained by using the expandable composite resin bead may not show sufficient rigidity. This is probably because the content of the PP resin having a long graft chain of a PS chain is too large. Accordingly, the absorbance ratio A ($D_{698}/D_{1376}$) of the acetone solubles is preferably 8.5 or more, more preferably 10 or more, and further preferably 12 or more. The absorbance ratio A ($D_{698}/D_{1376}$) of the acetone solubles can be determined by combining any of all the aforementioned preferable ranges, more preferable ranges and further preferable ranges of the upper and lower limits. In addition, the composite resin expanded bead and the foamed resin molded article obtained by using the expandable composite resin bead also contain xylene solubles, and the xylene solubles contain acetone solubles to be obtained by the same methods as those of the expandable composite resin bead, and the absorbance ratio A ($D_{598}/D_{1376}$) of the acetone solubles of the composite resin expanded bead and the foamed resin molded article is preferably in the same range as that of the expandable composite resin bead.

Besides, with respect to an absorbance ratio R ($D_{698}/D_{1376}$) of an absorbance $D_{698}$ to an absorbance $D_{1376}$ that are respectively measured at a wavenumber of 698 cm$^{-1}$ and at a wavenumber of 1376 cm$^{-1}$ as infrared absorption spectra of the composite resin contained in the expandable composite resin bead, a ratio of the aforementioned absorbance ratio A to the absorbance ratio R (the absorbance ratio A/absorbance ratio R) is preferably 1 or more and less than 2. The ratio of the absorbance ratio A/absorbance ratio R falling in the aforementioned range means that the proportion of the amount of the PP-g-PS resin having a long graft chain with respect to the total amount of the PP resin and the PP-g-PS resin is large. When the ratio of the absorbance ratio A/absorbance ratio R falls in the aforementioned range, particularly excellent restorability can be exhibited. From the same viewpoint, the ratio of the absorbance ratio A/absorbance ratio R is more preferably 1.1 to 1.5. It is noted that in a composite resin obtained by polymerizing styrene in polypropylene, when the mass ratio therebetween (polypropylene:styrene) is in a range of 100:400 to 100:1900, the absorbance ratio R ($D_{698}/D_{1376}$) of the whole composite resin is roughly in a range of 8.5 to 19.

The expandable composite resin bead having the absorbance ratio A of the acetone solubles falling in the prescribed range can be obtained by adjusting production conditions. Specifically, the styrene monomer is impregnated dividedly in a plurality of times in a nuclear bead containing the PP resin, the ratio of initially impregnated styrene monomer (i.e., a first monomer described later) is set to be comparatively large and the first monomer is polymerized with a ratio of a polymerization initiator to the first monomer set to be comparatively small. Accordingly, a polymerized state of the styrene monomer at an initial stage of polymerization in a nuclear bead containing a PP resin can be controlled. As a result, the PP-g-PS resin having a long graft chain of a PS chain is generated in a large amount, and hence, the expandable composite resin bead having the absorbance ratio A falling in the prescribed range can be produced. In a conventionally examined production condition, the ratio of a styrene monomer to be impregnated in a nuclear bead containing a PP resin (corresponding to the first monomer) is small and the amount of the polymerization initiator added is large, and therefore, it is presumed that a PP-g-PS resin having a short graft chain (a PS chain) is principally generated. Therefore, most of the PP-g-PS resin is contained in acetone insolubles, and hence, the absorbance ratio A of acetone solubles falls out of the prescribed range.

The morphologies of the composite resin contained in the expandable composite resin bead are classified into a morphology (a sea-sea structure) in which the PP resin and the PS resin having a form of the polymer of the styrene monomer form a co-continuous phase, a morphology (an island-sea structure) in which the PP resin forms a dispersed phase (an island phase) and the PS resin forms a continuous phase (a sea phase), and a morphology (a sea-island structure) in which the PP resin forms a continuous phase and the PS resin forms a dispersed phase. Among these morphologies, the morphology (the sea-island structure) in which the PP resin forms a continuous phase and the PS resin forms a dispersed phase is preferred. In this case, the restorability of the composite resin expanded bead and the foamed resin molded article obtained by using the expandable composite resin bead can be further improved.

The morphology of the expandable composite resin bead can be observed with the following method. First, an observation sample is cut out from the center part of the expandable composite resin bead. Next, the observation sample is embedded in an epoxy resin and dyed with ruthenium tetraoxide, and an ultra-thin section is prepared from the resultant sample by using an ultramicrotome. The ultra-thin section is placed on a grid, and the morphology in the cross section of the center part of the expandable composite resin bead is observed with a transmission electron microscope (JEM 1010 manufactured by JEOL Ltd. or the like) with magnification of 10000× to obtain a cross-sectional photograph (a TEM photograph). In the cross-sectional photograph, the morphology of the PP resin phase and the PS resin phase in the expandable composite resin bead is visually observed. It should be noted that when the composite resin has the aforementioned morphology in the center part of the expandable composite resin bead, it has been confirmed that a composite resin expanded bead and a foamed resin molded article having better restorability can be obtained. In this case, it can be regarded that a similar morphology is attained not only in the center part of the expandable composite resin bead but also substantially in the whole of the expandable composite resin bead excluding its surface part.

The average particle diameter of the dispersed phase in the cross section of the expandable composite resin bead is preferably 0.30 μm or more. In this case, the blowing agent retainability and the expandability of the expandable composite resin bead can be further improved. From the same viewpoint, the average particle diameter of the dispersed phase is more preferably 0.35 μm or more. It is noted that the particle diameter of the dispersed phase can be calculated with respect to the diameter of a circle having the same area as the dispersed phase. The average particle diameter corresponds to an arithmetic mean value of such diameters.

Examples of the PP resin contained in the composite resin include a propylene homopolymer, a propylene-ethylene random copolymer, a propylene-ethylene block copolymer, a propylene-butene random copolymer, a propylene-butene block copolymer, and a propylene-ethylene-butene random copolymer. A ratio of a comonomer component in the PP resin is preferably 10% by mass or less. Besides, as the PP resin, one of these can be used alone, or a combination of two or more of these can be used. Among these polymers, a homopolymer or a copolymer polymerized by using a metallocene polymerization catalyst is more preferably used as the PP resin. In this case, the post-compression restorability of the composite resin expanded bead and the foamed resin molded article can be further improved.

Besides, the melting point of the PP resin used in the nuclear bead is preferably 115 to 140° C. In this case, the expandability of the expandable composite resin bead can be improved. Furthermore, the in-mold molding temperature for obtaining the composite resin expanded bead can be lowered. From the same viewpoint, the melting point of the PP resin is preferably 115 to 135° C., and more preferably 120 to 130° C.

The melting point of the PP resin can be measured by performing heat flux differential scanning calorimetry on 2 to 4 mg of the PP resin by using a DSC calorimeter (Model 2010 manufactured by TA Instruments or the like). The heat flux differential scanning calorimetry is performed in accordance with JIS K7121 (1987). The measurement sample has been subjected to a specified heat treatment according to "3. Conditioning of Test Samples (2) of JIS K7121 (1987)" (the cooling rate is 10° C./minute). Through this measurement, a peak top temperature corresponding to an endothermic peak on a DSC curve obtained under condition of a heating rate of 10° C./min can be obtained as the melting point of the PP resin.

In the present specification, not only styrene and a styrene derivative but also a vinyl monomer, which is added as occasion demands and is copolymerizable with styrene or a styrene derivative, may be together designated as a styrene monomer in some cases. It is noted that the content of styrene and/or a styrene derivative in the styrene monomer is preferably 80% by mass or more.

Examples of the styrene derivative include α-methylstyrene, o-methylstyrene, m-methylstyrene, p-methylstyrene, p-ethylstyrene, 2,4-dimethylstyrene, p-methoxystyrene, p-n-butylstyrene, p-t-butylstyrene, o-chlorostyrene, m-chlorostyrene, p-chlorostyrene, 2,4,6-tribromostyrene, divinylbenzene, styrene sulfonic acid, and sodium styrenesulfonate. As the styrene derivative, one of these can be used alone, or two or more of these can be used together.

Besides, examples of the vinyl monomer copolymerizable with styrene or a styrene derivative include acrylic ester, methacrylic ester, a vinyl compound having a hydroxyl group, a vinyl compound having a nitrile group, an organic acid vinyl compound, a diene compound, a halogenated vinyl compound, a halogenated vinylidene compound, and a maleimide compound.

Examples of the acrylic ester include methyl acrylate, ethyl acrylate, propyl acrylate, butyl acrylate, and 2-ethylhexyl acrylate. Examples of the methacrylic ester include methyl methacrylate, ethyl methacrylate, propyl methacrylate, butyl methacrylate, and 2-ethylhexyl methacrylate. Examples of the vinyl compound having a hydroxyl group include hydroxyethyl acrylate, hydroxypropyl acrylate, hydroxyethyl methacrylate, and hydroxypropyl methacrylate. Examples of the vinyl compound having a nitrile group include acrylonitrile and methacrylonitrile. Examples of the organic acid vinyl compound include vinyl acetate and vinyl propionate. Examples of the diene compound include butadiene, isoprene, and chloroprene. Examples of the halogenated vinyl compound include vinyl chloride and vinyl bromide. An example of the halogenated vinylidene compound includes vinylidene chloride. Examples of the maleimide compound include N-phenyl maleimide and N-methyl maleimide. As the vinyl monomer, one of these can be used alone, or two or more of these can be used together.

From the viewpoint of improving the expandability of the expandable composite resin bead, the styrene monomer is preferably styrene alone, or a mixture of styrene and an acrylate. Besides, from the viewpoint of the expandability of the expandable composite resin bead, styrene and butyl acrylate are preferably used as the styrene monomer to produce the expandable composite resin bead as described in Examples later. In this case, the content of a butyl acrylate component in the composite resin is preferably 0.5 to 10 parts by mass, more preferably 1 to 5 parts by mass, and further preferably 1 to 3 parts by mass with respect to 100 parts by mass of the whole composite resin.

The weight average molecular weight of the PS resin is preferably 150000 to 800000. In this case, the shrinkage can be prevented in expanding the expandable composite resin bead. In addition, the fusion-bonding property among the composite resin expanded beads can be improved in the in-mold molding of the composite resin expanded beads. As a result, the dimensional stability of the foamed resin molded article can be improved. From the same viewpoint, the weight average molecular weight of the PS resin is more preferably 200000 to 700000, and further preferably 250000 to 500000. The range of the weight average molecular weight of the PS resin can be determined by combining any of all the aforementioned preferable ranges, more preferable ranges and further preferable ranges of the upper and lower limits. A measurement method for the weight average molecular weight of the PS resin will be described later in the Examples.

The glass transition temperature (Tg) of the PS resin is preferably 90 to 103° C. In this case, the expandability of the expandable composite resin bead can be improved, and the shrinkage caused in the expansion can be prevented. Besides, the fusion-bonding property among the composite resin expanded beads can be improved in the in-mold molding of the composite resin expanded bead obtained by expanding the expandable composite resin beads, and the dimensional stability of the foamed resin molded article to be obtained can be improved. The glass transition temperature (Tg) of the PS resin is more preferably 90 to 100° C. A measurement method for the glass transition temperature (Tg) of the PS resin will be described later in the Examples.

The expandable composite resin bead contains an organic physical blowing agent. Examples of the organic physical blowing agent include a saturated hydrocarbon compound having 3 to 6 carbon atoms, a lower alcohol having 5 or less carbon atoms, and an ether compound having 6 or less carbon atoms. Specific examples include propane, n-butane, isobutane, cyclobutane, n-pentane, isopentane, neopentane, cyclopentane, n-hexane, and cyclohexane. As the blowing agent, one of these can be used alone, or two or more of these can be used together. It is noted that "blowing agent" is also called "foaming agent" or "expanding agent" in some cases.

As the organic physical blowing agent, a saturated hydrocarbon compound having 3 to 6 carbon atoms is preferably used, and a mixture of 30 to 80% by mass of isobutane and 20 to 70% by mass of another hydrocarbon having 4 to 6 carbon atoms is more preferably used, on condition that the total amount of isobutane and another hydrocarbon having 4 to 6 carbon atoms is 100% by mass. When the ratio between isobutane and another hydrocarbon having 4 to 6 carbon atoms is adjusted as above, the organic physical blowing agent can be sufficiently impregnated in the expandable composite resin bead, and the expandable composite resin bead can sufficiently retain the organic physical blowing agent. Besides, in this case, the expandability of the composite resin expanded bead can be improved in the molding. Furthermore, in this case, the fusion-bonding property among the expanded beads can be further improved in the foamed resin molded article. The proportion of isobutane in the organic physical blowing agent is more preferably 40% by mass or more and 75% by mass or less.

Besides, the content of the organic physical blowing agent in the expandable composite resin bead is preferably 3 to 10% by mass. In this case, the expandability of the expandable composite resin bead can be further improved, and the shrinkage caused in the expansion can be prevented. Furthermore, the fusion-bonding property among the composite resin expanded beads can be further improved in the in-mold molding of the composite resin expanded bead obtained by expanding the expandable composite resin bead. As a result, the dimensional stability of the resultant foamed resin molded article can be improved. The content of the organic physical blowing agent is more preferably 4% by mass or more and 9% by mass or less.

The expandable composite resin bead can be produced, for example, as follows. First, nuclear beads containing a PP resin as a main component are suspended in an aqueous medium to prepare a suspension. Next, a styrene monomer is added to the suspension. Thus, the styrene monomer is impregnated in each of the nuclear beads to be polymerized, and a blowing agent is further impregnated in the nuclear bead, so that the expandable composite resin bead can be produced. In impregnating the nuclear bead with the styrene monomer and polymerizing the styrene monomer, the amount of the styrene monomer used is divided, for example, as a first monomer and a second monomer as in dispersion processing and modification processing described later, so that the divided amounts of the monomer can be preferably added at different timings.

The expandable composite resin bead can be produced by performing, for example, the dispersion processing, the modification processing and blowing agent impregnation processing described below. In the dispersion processing, the first monomer (the styrene monomer) and a polymerization initiator are added to a suspension in which nuclear beads containing a PP resin as a main component are suspended in an aqueous medium, so as to cause the first monomer to be dispersed in the suspension. In the modification processing, the suspension is heated, and the second monomer (the styrene monomer) is continuously added to the suspension over a prescribed addition time at a temperature ranging from Tm−20° C. to Tm+30° C. when Tm is the melting point of the PP resin contained in the nuclear beads, so as to impregnate each of the nuclear beads with the styrene monomer and polymerize the styrene monomer. In the blowing agent impregnation processing, a resin bead obtained during and/or after the polymerization is impregnated with an organic physical blowing agent at a temperature ranging from Tg−10° C. to Tg+40 (° C.) (wherein the temperature Tg is the glass transition temperature (° C.) of a PS resin corresponding to a polymer of the styrene monomer), and thus, the expandable composite resin bead is obtained.

The respective processing in the production method for the expandable composite resin bead will now be described in more details.

In the dispersion processing, a suspension can be prepared by suspending nuclear beads in an aqueous medium containing, for example, a suspension agent, a surfactant, a water-soluble polymerization inhibitor and the like.

The nuclear bead can contain an additive such as a cell controlling agent, a pigment, a slipping agent, an antistatic agent, or a flame retardant. The nuclear bead can be produced by blending the PP resin and a dispersion diameter enlarging agent (a thermoplastic resin) that is added if necessary, melt-kneading and finely granulating the blended material. The melt-kneading operation can be performed by using an extruder. When the dispersion diameter enlarging agent is used, the size of a PS resin phase can be adjusted to control the morphology between the PP resin and the PS resin. As a result, the blowing agent retainability and expansion molding property can be improved, and furthermore, a foamed resin molded article having excellent strength while retaining restorability, that is, a characteristic of the PP resin, can be realized.

At least one selected from the group consisting of polystyrene, an acrylonitrile-styrene copolymer, rubber-modified polystyrene, an ABS resin and an AES resin can be used as the dispersion diameter enlarging agent to be kneaded into the nuclear bead. Preferably, an acrylonitrile-styrene copolymer is used. Besides, the amount of an acrylonitrile unit component in the acrylonitrile-styrene copolymer is preferably 20 to 40% by mass.

The content of the dispersion diameter enlarging agent in the nuclear bead is preferably 1 to 10 parts by mass, and more preferably 3 to 7 parts by mass with respect to 100 parts by mass of the PP resin contained in the nuclear bead. When the content of the dispersion diameter enlarging agent falls in the above-described range, the dispersion diameter of the PS resin (the dispersed phase) can be easily increased in the morphology (the sea-island structure) in which the PP resin forms a continuous phase and the PS resin forms the dispersed phase. As a result, the blowing agent retainability performance of the expandable composite resin bead can be sufficiently improved. Besides, also from the viewpoint of retaining good restorability and rigidity of a foamed resin molded article obtained by the expansion and the in-mold molding of the expandable composite resin bead, the content of the dispersion diameter enlarging agent is preferably set to the aforementioned range.

To the nuclear bead, a cell controlling agent can be added for adjusting the foam cell size of a composite resin expanded bead obtained after the expansion of the expandable composite resin bead. As the cell controlling agent, an organic substance such as higher fatty acid bisamide or a higher fatty acid metal salt can be used. Alternatively, a known inorganic substance can be used as the cell controlling agent. When the cell controlling agent of an organic substance is used, the mixing amount is preferably in a range of 0.01 to 2 parts by mass with respect to 100 parts by mass of the resin contained in the nuclear bead. Alternatively, if the cell controlling agent of an inorganic substance is used, the mixing amount is preferably in a range of 0.1 to 5 parts by mass with respect to 100 parts by mass of the resin used for the nuclear bead.

The granulation of the nuclear bead can be performed by cutting the blended materials that have been melt-kneaded with the extruder, using a strand cutting method, a hot cutting method, an underwater cutting method or the like. Any other method can be employed as long as a desired particle diameter can be attained. In consideration of balance between the blowing agent retainability of the expandable composite resin bead and a filling property in a metal mold in performing the in-mold molding of the expanded bead, the particle diameter of the nuclear bead is preferably 0.1 to 3.0 mm, and more preferably 0.3 to 1.5 mm. The range of the particle diameter of the nuclear bead can be determined by combining any of all the aforementioned preferable ranges and more preferable ranges of the upper and lower limits. It is noted that when the extruder is used, a nuclear bead with a desired particle diameter can be produced by, for example, adjusting the size of a die and a cutting speed.

The particle diameter of the nuclear bead can be measured, for example, as follows. Electron micrographs of nuclear beads are observed to measure the maximum diameter of each of 200 or more nuclear beads, and an arithmetic mean value of the thus measured maximum diameters is defined as the particle diameter of the nuclear bead.

A plurality of the nuclear beads are generally suspended in an aqueous medium to prepare a suspension. The dispersion in the aqueous medium can be performed by using, for example, a sealed container equipped with a stirrer. An example of the aqueous medium includes deionized water.

The nuclear beads are preferably dispersed in the aqueous medium together with a suspension agent. Examples of the suspension agent include inorganic suspension agents in the form of fine particles, such as tricalcium phosphate, hydroxyapatite, magnesium pyrophosphate, magnesium phosphate, aluminum hydroxide, ferric hydroxide, titanium hydroxide, magnesium hydroxide, barium phosphate, calcium carbonate, magnesium carbonate, barium carbonate, calcium sulfate, barium sulfate, talc, kaolin, and bentonite. Alternatively, an organic suspension agent such as polyvinyl pyrrolidone, polyvinyl alcohol, ethyl cellulose or hydroxypropyl methyl cellulose can be used. Preferably, tricalcium phosphate, hydroxyapatite, magnesium or pyrophosphate is used. As the suspension agent, one of these can be used alone, or two or more of these can be used together.

The amount of the suspension agent used is preferably 0.05 to 10 parts by mass in terms of a solid content with based on 100 parts by mass of an aqueous medium of a suspension polymerization system (i.e., whole water contained in the system including water of a reaction product-containing slurry and the like). The amount is more preferably 0.3 to 5 parts by mass.

Besides, a surfactant may be added to the suspension. As the surfactant, for example, an anionic surfactant, a nonionic surfactant, a cationic surfactant, or an amphoteric surfactant can be used.

Examples of the anionic surfactants include sodium alkyl sulfonate, sodium alkylbenzene sulfonate, sodium lauryl sulfate, sodium α-olefin sulfonate, and sodium dodecyl diphenyl ether disulfonate. Examples of the nonionic surfactants that can be used include polyoxyethylene dodecyl ether, polyoxyethylene nonylphenyl ether, and polyoxyethylene lauryl ether.

As the cationic surfactants, alkylamine salts such as coconut amine acetate and stearylamine acetate can be used. In addition, quaternary ammoniums such as lauryl trimethyl ammonium chloride and stearyl trimethyl ammonium chloride can also be used.

As the amphoteric surfactants, alkyl betaines such as lauryl betaine and stearyl betaine can be used. In addition, alkylamine oxides such as lauryl dimethylamine oxide can also be used. These surfactants can be used alone, or two or more of these can be used together.

Preferably, an anionic surfactant is used as a surfactant. More preferably, an alkali metal salt (preferably, a sodium salt) of an alkyl sulfonic acid having 8 to 20 carbon atoms is used. When such a surfactant is used, the suspension can be sufficiently stabilized. Besides, to the suspension, an electrolyte of a mineral salt, such as lithium chloride, potassium chloride, sodium chloride, sodium sulfate, sodium nitrate, sodium carbonate, or sodium bicarbonate can be added if necessary.

Besides, in order to obtain a foamed resin molded article excellent in toughness and mechanical strength, a water-soluble polymerization inhibitor is preferably added to the suspension. Examples of the water-soluble polymerization inhibitor include sodium nitrite, potassium nitrite, ammonium nitrite, L-ascorbic acid, and citric acid. The water-soluble polymerization inhibitor is difficult to impregnate into the nuclear bead and is dissolved in the aqueous medium. Accordingly, the styrene monomer impregnated in the nuclear bead is polymerized, but polymerization is suppressed for minute droplets of the styrene monomer in the aqueous medium which is not impregnated into the nuclear bead, and for the styrene monomer that is located around the surface of the nuclear bead and is in the process of being impregnated into the nuclear bead. As a result, the amount of the PS resin present on the surface of the expandable composite resin bead can be controlled to be less, and the retainability of the blowing agent can be speculated to be further improved. The amount of the water-soluble polymerization inhibitor added is preferably 0.001 to 0.1 part by mass, and more preferably 0.005 to 0.06 part by mass with respect to 100 parts by mass of the aqueous medium (i.e., the whole water contained in the system including water of a reaction product-containing slurry and the like).

Besides, in the dispersion processing, a first monomer and a polymerization initiator are added to the suspension. The first monomer added in the dispersion processing corresponds to a styrene monomer to be added at a temperature lower than the temperature at which a second monomer is added in the modification processing, namely, at a temperature lower than Tm−20° C. The first monomer can be further divided into a plurality of monomers to be added at different timings as long as the addition temperature is lower than Tm−20° C. Preferably, the first monomer is added at one time.

A seed ratio of the styrene monomer (the first monomer) (i.e., a mass ratio of the amount of the first monomer to the amount of the PP resin contained in the nuclear bead) in the dispersion processing is preferably 1 or more. In this case, the absorbance ratio A ($D_{698}/D_{1376}$) of the acetone solubles can be adjusted to fall in the prescribed range. Besides, if the seed ratio is low, the expandable composite resin bead is flattened, and hence the filling property in the molding may be degraded. The seed ratio of the first monomer is more preferably higher than 1. On the other hand, if the seed ratio is too high, the styrene monomer may be polymerized before being sufficiently impregnated in the nuclear bead, and hence a block of the resin may be produced. Accordingly, the seed ratio of the first monomer is preferably 3 or less, more preferably 2 or less, and further preferably 1.5 or less. The range of the seed ratio of the first monomer can be determined by combining any of all the aforementioned preferable ranges, more preferable ranges and the further preferable ranges of the upper and lower limits.

Furthermore, in order to uniformly polymerize the styrene monomer in the nuclear bead, the styrene monomer is impregnated in the nuclear bead and polymerized. In the polymerization of the styrene monomer, a polymerization initiator can be used. The polymerization initiator is preferably dissolved in the styrene monomer beforehand.

The usage amount of the polymerization initiator used is preferably 0.01 to 1.5 parts by mass with respect to 100 parts by mass of the total amount of the nuclear bead and the styrene monomer. When the amount of the polymerization initiator used falls in this range, the expandable composite resin bead having the absorbance ratio A falling in the prescribed range can be obtained. Furthermore, from the viewpoint of further improving the restorability of the foamed resin molded article, the upper limit of the amount of the polymerization initiator used is preferably 1 part by mass, and more preferably 0.8 part by mass. The lower limit of the amount of the polymerization initiator used is more preferably 0.05 part by mass, and further preferably 0.1 part by mass. It is noted that the polymerization initiator can be used not only in the dispersion processing but also in the modification processing. In this case, the total amount of the polymerization initiator used is preferably set to fall in the aforementioned range.

As the polymerization initiator, for example, a substance used in suspension polymerization of a styrene monomer can be used. For example, a polymerization initiator that is soluble in a vinyl monomer and has a 10 hour half-life temperature of 50 to 120° C. can be used. Specific examples thereof that can be used include organic peroxides such as cumene hydroxy peroxide, di-cumyl peroxide, t-butylperoxy-2-ethylhexanoate, t-butyl peroxybenzoate, benzoyl peroxide, t-butyl peroxyisopropylcarbonate, t-amyl peroxy-2-ethylhexyl carbonate, hexylperoxy-2-ethylhexyl carbonate, and lauroyl peroxide. Furthermore, as the polymerization initiator, azo compounds such as azobis isobutyronitrile can also be used. These polymerization initiators can be used alone, or two or more of these can be used together. From the viewpoint that the absorbance ratio A can be easily adjusted to fall in the prescribed range and the amount of remaining monomer can be easily reduced, dicumyl peroxide or t-butyl peroxy-2-ethylhexanoate is preferably used as the polymerization initiator.

Besides, a cell controlling agent can be added to the styrene monomer. As the cell controlling agent, for example, a fatty acid monoamide, a fatty acid bisamide, talc, silica, polyethylene wax, methylene-bis-stearic acid, a methyl methacrylate copolymer, and silicone can be used. Examples of the fatty acid monoamide include oleic acid amide, and stearic acid amide. An example of the fatty acid bisamide includes ethylene-bis-stearic acid amide. The cell controlling agent is used preferably in an amount of 0.01 to 2 parts by mass with respect to 100 parts by mass of the styrene monomer.

Besides, a plasticizer, an oil-soluble polymerization inhibitor, a flame retardant, a dye and the like can be added to the styrene monomer if necessary. Examples of the plasticizer include a fatty acid ester, an acetylated monoglyceride, fats and oils, and a hydrocarbon compound. Examples of the fatty acid ester include glycerin tristearate, glycerin trioctoate, glycerin trilaurate, sorbitan tristearate, sorbitan monostearate, and butyl stearate. An example of the acetylated monoglyceride includes glycerin diacetomonolaurate. Examples of the fats and oils include hardened beef tallow and hydrogenated castor oil. Examples of the hydrocarbon compound include cyclohexane and liquid paraffin. Examples of the oil-soluble polymerization inhibitor include para-t-butylcatechol, hydroquinone and benzoquinone.

Next, in the modification processing, the suspension resulting from the dispersion processing is heated. When the melting point of the PP resin contained in the nuclear bead, the second monomer (the styrene monomer) is added to the suspension continuously over a prescribed addition time at a temperature of Tm−20° C. to Tm+30° C. In this manner, the styrene monomer can be impregnated in the nuclear bead and polymerized. When the temperature at which the second monomer is added does not fall in the range of Tm−20° C. to Tm+30° C., the suspension system becomes unstable, and a block of the resin is generated. The temperature at which the second monomer is added is more preferably Tm−10° C. to Tm+10° C.

Next, in the blowing agent impregnation processing, during and/or after the polymerization of the styrene monomer, an organic physical blowing agent is impregnated in the resin bead to obtain an expandable composite resin bead. In other words, the blowing agent can be impregnated during and/or after the polymerization of the styrene monomer. Specifically, the organic physical blowing agent is injected into a vessel containing the resin bead during and/or after the polymerization, so as to impregnate the blowing agent in the resin bead.

When Tg (° C.) is the glass transition temperature of the PS resin, the temperature at which the blowing agent is impregnated is preferably in a range of Tg−10° C. to Tg+40° C., and more preferably in a range of Tg−5° C. to Tg+25° C.

Besides, after the impregnation of the organic physical blowing agent, the expandable composite resin bead may be dewatered and dried, and a surface coating material may be coated on the surface of the expandable composite resin bead if necessary. Examples of the surface coating material include zinc stearate, triglyceride stearate, monoglyceride stearate, and hydrogenated castor oil. Alternatively, an antistatic agent can be used as a functional surface coating material. The amount of the surface coating material added is preferably 0.01 to 2 parts by mass with respect to 100 parts by mass of the expandable composite resin bead.

When the expandable composite resin bead is heated by a heating medium to foam and expand, the composite resin expanded bead can be obtained. Specifically, the expandable composite resin bead can be expanded by introducing a heating medium such as steam into a pre-expander to which the expandable composite resin bead has been supplied. Furthermore, the expandable composite resin bead can also be expanded by discharging the expandable composite resin bead, which is dispersed in an aqueous medium within a sealed container, out from the sealed container together with the dispersion medium. The bulk density of the composite resin expanded beads is preferably 5 to 200 kg/m$^3$, and more preferably 8 to 100 kg/m$^3$.

For example, a large number of composite resin expanded beads filled in a bag can be used as a cushion or a mattress. In this case, the characteristics of the composite resin expanded bead having lightweightness and showing both the rigidity and the restorability can be sufficiently made use of. Besides, the composite resin expanded bead can be used not only as a cushion as described above but also for the in-mold molding. In other words, when the composite resin expanded beads are in-mold molded by well-known molding method, the foamed resin molded article can be obtained. Also in this case, the foamed resin molded article can show high rigidity and excellent restorability while having lightweightness. The apparent density of the foamed resin molded article is preferably 5 to 200 kg/m$^3$, and more preferably 8 to 100 kg/m$^3$.

The closed cell rate of the foamed resin molded article is preferably 80% or more. In this case, the foamed resin molded article can definitely exhibit the excellent restorability in spite of having excellent rigidity. A measurement method for the closed cell rate will be described later in the Examples.

The compression set of the foamed resin molded article is preferably 10% or less. In this case, the foamed resin molded article can definitely exhibit the excellent restorability. The compression set of the foamed resin molded article is more preferably 8% or less, and further preferably 5% or less. A measurement method for the compression set will be described later in the Examples.

EXAMPLES

Now, Examples and Comparative Examples of the expandable composite resin bead will be described. It is to be noted that the present invention is not limited to the examples.

Example 1

In this example, an expandable composite resin bead is produced to be used for producing a composite resin expanded bead and a foamed resin molded article (a molded article formed from the composite resin expanded beads). A method for producing the expandable composite resin bead of this example will now be described.
(1) Preparation of Nuclear Bead
As a PP resin, a propylene-ethylene random copolymer "F-794NV" manufactured by Prime Polymer Co., Ltd. was prepared. The melting point Tm (° C.) of this PP resin is shown in Table 1 below. Next, the PP resin was supplied to an extruder and was melt-kneaded in the extruder at a temperature of 230° C., and the resultant melt-kneaded product was extruded through a die, which is provided at the tip of the extruder and includes sixteen nozzles each having a hole diameter of 2 mm, into the form of a strand. Subsequently, the melt-kneaded product in the form of a strand was cooled and cut into a prescribed length, and thus, mini-pellets (nuclear beads) having an average particle diameter ($d_{63}$) of 1 mm were prepared. These nuclear beads will be hereinafter designated as the "nuclear bead A".
(2) Production of Expandable Composite Resin Bead An autoclave having an internal volume of 3 L and equipped with a stirrer was charged with 1000 g of deionized water, and 6.0 g of sodium pyrophosphate was added thereto and dissolved therein. Thereafter, 12.9 g of magnesium nitrate hexahydrate in the form of a powder was further added to the autoclave, followed by stirring at room temperature for 30 minutes. Thus, a magnesium pyrophosphate slurry was prepared as a suspension agent.

Next, to the suspension agent held in the autoclave, 1.25 g of sodium lauryl sulfate (10 mass % aqueous solution) used as a surfactant and 75 g of the nuclear beads (the above-described nuclear bead A) were charged, followed by stirring at a stirring rate of 500 rpm. Then, 0.25 g of dicumyl peroxide ("PERCUMYL D" manufactured by NOF Corporation) used as a polymerization initiator was dissolved, as a first monomer, in 80 g of styrene, and the resultant was added to the autoclave (which processing corresponds to the dispersion processing).

Subsequently, after replacing the air inside the autoclave with nitrogen, the inside temperature of the autoclave was increased up to 130° C. over 1 hour and 30 minutes. After increasing the temperature, the temperature of 130° C. was kept for 2 hours. Thereafter, the autoclave was cooled to a temperature of 120° C. over 30 minutes. After cooling, the temperature of 120° C. was kept for 3 hours and 30 minutes.

Besides, 0.75 g of dicumyl peroxide ("PERCUMYL D" manufactured by NOF Corporation) used as a polymerization initiator was dissolved, as a second monomer, in 345 g of styrene, and the resultant was added to the autoclave over 3 hours and 30 minutes when the temperature of 120° C. was reached as described above. Furthermore, the temperature was increased up to 130° C. over 1 hour, and after keeping the temperature of 130° C. for 5 hours, the autoclave was cooled to a temperature of 30° C. over 6 hours (which processing corresponds to the modification processing). After cooling, the content of the autoclave was taken out, and dewatered and rinsed by using a centrifuge, and a water content remaining on the surface was removed by an airborne dryer. Thus, a composite resin bead was obtained.

Next, an autoclave having an internal volume of 3 L and equipped with a stirrer was charged with 1000 g of deionized water, 5.0 g of tricalcium phosphate, 5 g of a 1 mass % aqueous solution of sodium alkyl diphenyl ether disulfonate ("PELEX SS-H" manufactured by Kao Corporation), and 500 g of the composite resin beads, followed by stirring at a stirring rate of 400 rpm. Subsequently, after replacing the air inside the autoclave with nitrogen, heating was started to increase the inside temperature of the autoclave up to 90° C. over 1 hour and 30 minutes. After increasing the temperature, the temperature of 90° C. was kept for 3 hours. When the temperature of 90° C. was reached, 20 g of cyclohexane and 65 g of butane (a mixture of 20% by volume of normal butane and 80% by volume of isobutane) were added as an organic physical blowing agent to the autoclave over 30 minutes. The inside temperature of the autoclave was further increased to 105° C. over 1 hour, and the temperature of 105° C. was kept for 5 hours (which processing corresponds to the blowing agent impregnation processing). Thereafter, the inside temperature of the autoclave was cooled to 30° C. over 6 hours.

After cooling, the content of the autoclave was taken out, and nitric acid was added to the content to dissolve magnesium pyrophosphate adhering to the surface of the resin beads. Thereafter, the resin beads were dewatered and rinsed by using a centrifuge, and a water content remaining on the surface was removed by an airborne dryer. Thus, expandable composite resin beads having an average particle diameter ($d_{63}$) of 2.0 mm were obtained.

FIG. 1 shows a transmission electron micrograph (with magnification of 10000×) in a cross section of the center part of the expandable composite resin bead obtained in this example. As a transmission electron microscope, JEM 1010 manufactured by JEOL Ltd. was used. In FIG. 1, a dark gray portion corresponds to the PP resin, and a light gray portion corresponds to the PS resin. As illustrated in this drawing, the expandable composite resin bead 1 of this example contains a composite resin 2 including the PP resin and a PS resin, that is, a polymer of the styrene monomer. The composite resin 2 contains a continuous phase 21 of the PP resin and a dispersed phase 22 of the PS resin dispersed in the continuous phase 21. In other words, the composite resin 2 of the expandable composite resin bead 1 of this example has the morphology of the sea-island structure in which the PP resin forms the continuous phase 21 and the PS resin forms the dispersed phase 22. Besides, although not shown in this drawing, the composite resin 2 is impregnated with the organic physical blowing agent.

To 100 parts by mass of the thus obtained expandable composite resin beads, 0.008 part by mass of N,N-bis(2-hydroxyethyl)alkylamine used as an antistatic agent was added, and a mixture of 0.12 part by mass of zinc stearate, 0.04 part by mass of glycerin monostearate, and 0.04 part by mass of glycerin distearate was further added thereto to coat the expandable composite resin beads.

Polymerization conditions for the expandable composite resin bead obtained as described above are shown in Table 2 below. Specifically, Table 2 shows the type of nuclear bead used, the mixing ratio (in parts by mass) of the styrene monomer (corresponding to the amount of the first monomer, and the amount of second monomer, and the total added amount of both) with respect to 100 parts by mass of the PP resin contained in the nuclear bead, the seed ratio (i.e., a mass ratio of the amount of the first monomer to the amount of the PP resin contained in the nuclear bead), the amount (in parts by mass) of butyl acrylate (BA) with respect to 100 parts by mass of the total amount of the nuclear bead and the styrene monomer, and the amount (in parts by mass) of the polymerization initiator with respect to 100 parts by mass of the total amount of the nuclear bead and the styrene monomer. Besides, the obtained expandable composite resin bead was examined as described below to obtain the following. The absorbance ratio A of acetone solubles contained in a xylene solution resulting from the Soxhlet extraction, the absorbance ratio R of the composite resin bead, the ratio therebetween (the absorbance ratio A/absorbance ratio R), the weight average molecular weight (Mw) of the PS resin, the glass transition temperature (Tg) of the PS resin, the average particle diameter of the dispersed phase, and the beads-life. The results are shown in Table 2 below.

[Absorbance Ratio A and Absorbance Ratio R]

First, approximately 1 g of the expandable composite resin beads was put in a 150-mesh wire mesh bag. Next, a 200 ml round bottom flask was charged with approximately 200 ml of xylene, and the sample put in the wire mesh bag was set on a Soxhlet extraction tube. The flask was heated by a mantle heater for 8 hours to perform the Soxhlet extraction. After completing the extraction, the resultant flask was cooled with air. The xylene solution resulting from the Soxhlet extraction was put in 600 ml of acetone. Through filtration by using a filter paper of type 5A defined in JIS P3801, a component dissolved in the acetone was separated and collected. Subsequently, the collected component was evaporated to dryness under reduced pressure. Thus, acetone solubles were obtained. In the acetone solubles, the PS resin and a PP-g-PS resin having a long graft chain are contained. The acetone solubles were hot pressed at a temperature of 200° C. into the shape of a film with a thickness of approximately 50 μm. Next, an infrared spectrophotometer, "FT/IR-460 plus" manufactured by JASCO Corporation was used to measure the infrared absorption spectra of the film-shaped molded article (i.e., the acetone solubles) by a transmission method. Subsequently, an absorbance $D_{698}$ at 698 $cm^{-1}$ derived from the out-of-plane deformation vibration of a benzene ring contained in the PS resin and an absorbance $D_{1376}$ at 1376 $cm^{-1}$ derived from the symmetric deformation vibration of $CH_3$ of $—C—CH_3$ hydrocarbon contained in the PP resin were measured, so as to obtain an absorbance ratio A ($D_{698}/D_{1376}$) between these absorbances. This measurement was performed on different five samples, and an arithmetic mean value of the results of the five samples was defined as the absorbance ratio A ($D_{698}/D_{1376}$). Besides, an absorbance ratio R ($D_{698}/D_{1376}$) was obtained in the same manner as described above except that a film-shaped molded article with a thickness of approximately 50 μm obtained by hot pressing the composite resin beads at 200° C. was used as a measurement sample.

[Weight Average Molecular Weight (Mw) of PS Resin]

First, the Soxhlet extraction was performed in the same manner as described above. Then, the xylene solution obtained after the extraction was charged in 600 ml of acetone. Through filtration by using a filter paper of type 5A defined in JIS P3801 (1995), a component dissolved in the acetone was separated and collected. The collected component was evaporated to dryness under reduced pressure to obtain acetone solubles containing the PS resin. Then, the weight average molecular weight of the PS resin contained in the acetone solubles was measured by gel permeation chromatography (GPC) (using a mixed gel column for measurement of a polymer) using polystyrene standards. Specifically, a measurement device (HLC-8320GPC Eco-SEC) manufactured by Tosoh Corporation was used under the following measurement conditions:

Eluent: tetrahydrofuran (THF)
Flow rate: 0.6 ml/min
Sample concentration: 0.1 wt %
Columns: one TSK guard column Super H-H and two TSK-GEL columns Super HM-H serially connected to one another In other words, the weight average molecular weight was obtained by dissolving the PS resin in tetrahydrofuran, subjecting the resultant to the gel permeation chromatography (GPC), and correcting the thus obtained value by using a standard polystyrene.

[Glass Transition Temperature (Tg) of PS Resin]

First, the Soxhlet extraction was performed in the same manner as described above. Then, the xylene solution obtained after the extraction was charged in 600 ml of acetone. Through filtration by using a filter paper of type 5A defined in JIS P3801 (1995), a component dissolved in the acetone was separated and collected. The collected component was evaporated to dryness under reduced pressure to obtain acetone solubles containing the PS resin. Then, the heat flux differential scanning calorimetry was performed on 2 to 4 mg of the PS resin by using a DSC calorimeter (Q1000) manufactured by TA Instruments. The heat flux differential scanning calorimetry was performed in accordance with JIS K7121 (1987). Thus, a midpoint glass transition temperature on a DSC curve obtained under a condition of a heating rate of 10° C./min was measured. This temperature corresponds to the glass transition temperature Tg of the PS resin. The measurement sample was subjected to a specified heat treatment according to "3. Conditioning of Test Samples (2) of JIS K7121 (1987)" (the cooling rate is 10° C./minute).

[Average Particle Diameter of Dispersed Phase]

First, an observation sample was cut out from a center part of the expandable composite resin bead. The observation sample was embedded in an epoxy resin and dyed with ruthenium tetraoxide, and an ultra-thin section was produced from the sample by using an ultramicrotome. The ultra-thin section was placed on a grid, and a morphology in a cross section of a center part (a center part) of the expandable composite resin bead was observed with a transmission electron microscope (JEM 1010 manufactured by JEOL Ltd.) with magnification of 10000× to obtain a cross-sectional photograph (a TEM photograph). In this TEM photograph, areas of randomly selected 100 dispersed phases were measured to calculate a diameter of a circle having the same area as each of the dispersed phases. This diameter corresponds to the diameter of each dispersed phase. Then, an arithmetic mean value of the diameters of the 100 dispersed phases was obtained. This arithmetic mean value corresponds to the average particle diameter of the dispersed phases.

[Beads-Life]

The expandable composite resin beads were kept for a predetermined time period in an open state at a temperature of 23° C. to dissipate the blowing agent from the expandable composite resin beads. Then, the expandable composite resin beads were foamed and expanded through heating for 270 seconds at a heating steam temperature of 107° C. to obtain expanded beads. Next, the expanded beads were dried for 24 hours at a temperature of 23° C. Next, the bulk density (kg/m$^3$) of the expanded beads after the drying was measured. The bulk density (kg/m$^3$) was obtained by preparing a 1-L measuring cylinder, filling the empty measuring cylinder to the 1-L marked line with the expanded beads, measuring the mass (g) of the expanded beads per 1 L, and performing unit conversion thereon. The definition of beads-life is the kept time period (days) during which expanded beads having a bulk density of 20 kg/m$^3$ and below were obtained, i.e., the kept time period (days) until expanded beads having a bulk density of 20 kg/m$^3$ and below cannot be obtained.

(3) Production of Composite Resin Expanded Bead

Next, the expandable composite resin beads obtained as described above were used for producing composite resin expanded beads having a bulk density of approximately 20 kg/m$^3$. Specifically, first, the expandable composite resin beads were stored in a sealed container at a temperature of 6° C. for 1 day. Then, the resultant expandable composite resin beads were put in an ordinary-pressure batch expander with a volume of 30 L, and steam was supplied into the expander. Thus, the expandable composite resin beads were foamed and expanded to a bulk density of approximately 20 kg/m$^3$, and thus, composite resin expanded beads having a bulk expansion ratio of 50 were obtained. It is noted that the bulk density (kg/m$^3$) of the composite resin expanded beads can be measured in the same manner as in the measurement of the bulk density of the expanded beads in the aforementioned evaluation for the beads-life of the expandable composite resin beads. The mass per liter of a bulk volume thus obtained was converted in the unit to obtain the bulk density (kg/m$^3$) of the composite resin expanded beads.

(4) Production of Foamed Resin Molded Article (Molded Article Formed from Composite Resin Expanded Beads)

First, the composite resin expanded beads obtained as described above were aged at room temperature for 1 day. Next, the resultant composite resin expanded beads were filled in a molded article molding machine (D-30SF manufactured by DAISEN Industry Co., Ltd.), and steam at a pressure of 0.10 to 0.25 MPa (G: gauge pressure) was supplied into the molding machine to produce a rectangular parallelepiped molded article with a size of 250 mm×200 mm×50 mm. The molding was performed, for example, under conditions where the expanded beads were heated at a steam pressure of 0.2 MPa (G) for 10 seconds, and after restoring the pressure to the atmospheric pressure, the resultant was cooled with water, and a mold was opened when the surface pressure reached 0.02 MPa (G) to release the foamed resin molded article. It is noted that Table 2 below shows a steam pressure (a molding pressure) at which the internal fusion ratio of the molded article is 80% or more.

In this manner, the composite resin expanded beads having a bulk density of approximately 20 kg/m$^3$ were molded to obtain a foamed resin molded article having an expansion ratio of 50. It is noted that the expansion ratio of the foamed resin molded article can be calculated in accordance with the following expression (1) by using an apparent density (kg/m$^3$) calculated by dividing the mass of the molded article with its volume:

Expansion ratio=1000/apparent density(kg/m$^3$)     (1)

Next, the expanded resin molded article was dried at a temperature of 40° C. for 1 day and further aged at room temperature for 3 days, and then was measured as described below to obtain the 50% compressive stress (kPa), the compression set (%), the closed cell rates (%) before and after a compression set test, and a ratio in the closed cell rates between before and after the compression set test (i.e., the closed cell rate after the compression set test/the closed cell rate before the compression set test). The results are shown in Table 2.

[50% Compressive Stress]

A plate-like test piece having a length of 50 mm, a width of 50 mm and a thickness of 25 mm was cut out from the foamed resin molded article, and a compression test was carried out in accordance with JIS K7220 (2006). It is noted that a compressive stress obtained when compression set is 50% corresponds to the 50% compressive stress (kPa).

[Compression Set]

A plate-like test piece having a length of 50 mm, a width of 50 mm and a thickness of 25 mm was cut out from the foamed resin molded article, and the compression set (%) was measured in accordance with JIS K6767 (1999).

[Closed Cell Rate]

After a cubical test piece having a height of 25 mm, a width of 25 mm, and a thickness of 25 mm was cut out from the foamed resin molded article, the test piece was kept for 1 day in a constant temperature room with relative humidity of 50% and temperature of 23° C. under atmospheric pressure. Next, the precise apparent volume $V_a$ of the test piece was measured. Next, after sufficiently drying the test piece, the true volume $V_x$ of the test piece was measured using a model 930 air comparison pycnometer manufactured by Toshiba-Beckman, Inc., based on procedure C set forth in ASTM-D2856-70. A closed cell rate was calculated from the following formula (2) based on the volume values $V_a$ and $V_x$. It should be noted that the measurement and calculation were performed on 5 different test pieces, and an average of those was obtained. This average was used as a closed cell rate.

$$\text{Closed cell rate}(\%)=(V_x-W/\rho)\times 100/(V_a-W/\rho) \quad (2)$$

($V_x$: True volume of the foamed resin molded article measured using the above described method, i.e., a sum (cm³) of the volume of the resin forming the foamed resin molded article and a total volume of foams at the closed cell parts in the foamed resin molded article. $V_a$: Apparent volume (cm³) of the foamed resin molded article measured as the amount of water level rise when the foamed resin molded article is sunk in water in a measuring cylinder. W: Weight (g) of the foamed resin molded article. ρ: Density (g/cm³) of the composite resin forming the foamed resin molded article.)

In the present example, the closed cell rates of the foamed resin molded article before the compression set test and after the compression set test were obtained based on the above described measuring method. With regard to the closed cell rate after the compression set test, the volume after the compression set test was taken into consideration, and a corrected value obtained from the following formula (3) was used.

$$\begin{aligned}&\text{Closed cell rate (corrected value after compression}\\&\text{set test:}(\%))=\text{Closed cell rate (actual measure-}\\&\text{ment value after compression set test:}(\%))\times\\&(100-\text{compression set }(\%))/100\end{aligned} \quad (3)$$

Example 2

Figure 2:
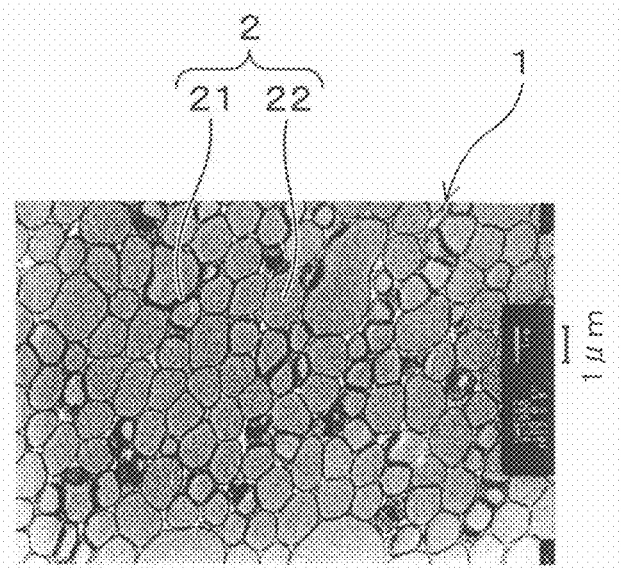
FIG. 2 shows a transmission electron micrograph in a cross section of a central part of an expandable composite resin bead according to Example 2.

In this example, an expandable composite resin bead, a composite resin expanded bead and a foamed resin molded article were produced in the same manner as in Example 1 except that nuclear beads produced by using, as the PP resin, a propylene-ethylene copolymer "WFX4T" manufactured by Japan Polypropylene Corporation were used. It is noted that the nuclear beads used in this example are hereinafter designated as the "nuclear bead B". The melting point Tm (° C.) of the PP resin contained in the nuclear bead B is shown in Table 1 below. A transmission electron micrograph (with magnification of 10000×) of the center part of the expandable composite resin bead obtained in this example is shown in FIG. 2. As for FIG. 2 and FIG. 3 to be referred to in this example and in Example 3 respectively, the same reference numerals as used in FIG. 1 referred to in Example 1 indicate the same components as in Example 1 and have been already explained in Example 1, and therefore will not be repeatedly explained hereafter.

Example 3

Figure 3:
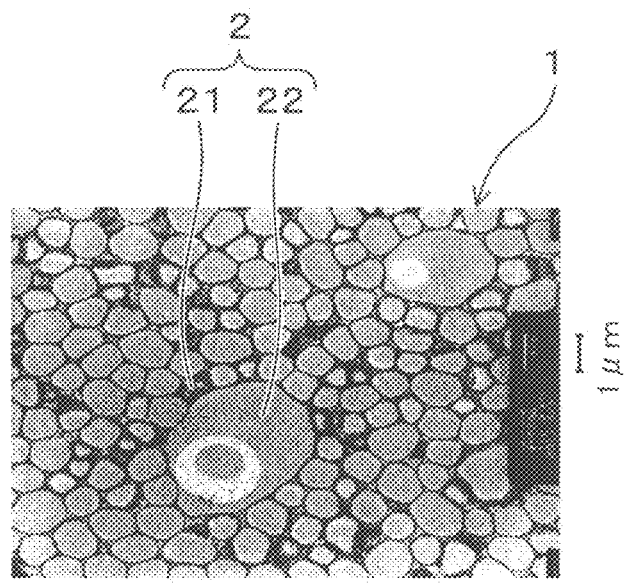
FIG. 3 shows a transmission electron micrograph in a cross section of a central part of an expandable composite resin bead according to Example 3.

In this example, an expandable composite resin bead, a composite resin expanded bead and a foamed resin molded article were produced in the same manner as in Example 1 except that a propylene-ethylene copolymer "WFX4T" manufactured by Japan Polypropylene Corporation was used as the PP resin, and that nuclear beads prepared by melt-kneading, in an extruder, 20 kg of this PP resin and 1 kg of an acrylonitrile-styrene copolymer ("AS-XGS", weight average molecular weight: 109000, acrylonitrile unit component: 28% by mass, MFR (200° C., 5 kgf): 2.8 g/10 min) used as a dispersion diameter enlarging agent were used. It is noted that the nuclear beads used in this example are hereinafter designated as the "nuclear bead C". The melting point Tm (° C.) of the PP resin contained in the nuclear bead C is shown in Table 1 below. A transmission electron micrograph (with magnification of 10000×) of the center part of the expandable composite resin bead obtained in this example is shown in FIG. 3. A salami-like portion present in a dispersed phase 22 (i.e., a light gray phase) of a PS resin in FIG. 3 corresponds to the dispersion diameter enlarging agent.

Example 4

In this example, an expandable composite resin bead, a composite resin expanded bead and a foamed resin molded article were produced in the same manner as in Example 1 except that nuclear beads prepared by using, as the PP resin, a propylene-ethylene copolymer "FL331G5" manufactured by Sumitomo Chemical Co., Ltd. were used. It is noted that the nuclear beads used in this example are hereinafter designated as the "nuclear bead D". The melting point Tm (° C.) of the PP resin contained in the nuclear bead D is shown in Table 1 below.

Example 5

In this example, an expandable composite resin bead, a composite resin expanded bead and a foamed resin molded article were produced in the same manner as in Example 1 except that the amount of the nuclear beads to be charged was changed to 95 g, that a mixed monomer of 90 g of styrene and 15 g of butyl acrylate (BA) was used as the first monomer, and that 300 g of styrene was used as the second monomer.

Example 6

In this example, an expandable composite resin bead, a composite resin expanded bead and a foamed resin molded article were produced in the same manner as in Example 1 except that a mixed monomer of 65 g of styrene and 15 g of butyl acrylate was used as the first monomer.

Example 7

In this example, an expandable composite resin bead, a composite resin expanded bead and a foamed resin molded article were produced in the same manner as in Example 1 except that the amount of the nuclear beads to be charged was changed to 25 g, that a mixed monomer of 20 g of styrene and 15 g of butyl acrylate was used as the first monomer, and that 440 g of styrene was used as the second monomer.

Example 8

In this example, an expandable composite resin bead, a composite resin expanded bead and a foamed resin molded article were produced in the same manner as in Example 1 except that the nuclear bead C was used as the nuclear beads and that a mixed monomer of 75 g of styrene and 5 g of butyl acrylate was used as the first monomer.

Example 9

In this example, an expandable composite resin bead, a composite resin expanded bead and a foamed resin molded article were produced in the same manner as in Example 1 except that the nuclear bead C was used as the nuclear beads and that a mixed monomer of 65 g of styrene and 15 g of butyl acrylate was used as the first monomer.

Example 10

In this example, an expandable composite resin bead, a composite resin expanded bead and a foamed resin molded article were produced in the same manner as in Example 1 except that the nuclear bead C was used as the nuclear beads and that a mixed monomer of 55 g of styrene and 25 g of butyl acrylate was used as the first monomer.

Example 11

In this example, an expandable composite resin bead, a composite resin expanded bead and a foamed resin molded article were produced in the same manner as in Example 1 except that the nuclear bead C was used as the nuclear beads, that a mixed monomer of 65 g of styrene and 15 g of butyl acrylate was used as the first monomer, and that the amount of the polymerization initiator to be dissolved in the first monomer was changed to 1.75 g.

Example 12

In this example, an expandable composite resin bead, a composite resin expanded bead and a foamed resin molded article were produced in the same manner as in Example 1 except that the nuclear bead C was used as the nuclear beads, that a mixed monomer of 65 g of styrene and 15 g of butyl acrylate was used as the first monomer, and that the amount of the polymerization initiator to be dissolved in the first monomer was changed to 4.25 g.

Example 13

In this example, an expandable composite resin bead, a composite resin expanded bead and a foamed resin molded article were produced in the same manner as in Example 1 except that the nuclear bead C was used as the nuclear beads, that a mixed monomer of 72.5 g of styrene and 15 g of butyl acrylate was used as the first monomer, and that 237.5 g of styrene was used as the second monomer.

Example 14

In this example, an expandable composite resin bead was produced in the same manner as in Example 1 except that the nuclear bead C was used as the nuclear beads and that a mixed monomer of 65 g of styrene and 15 g of butyl acrylate was used as the first monomer. Subsequently, a composite resin expanded bead and a foamed resin molded article were produced in the same manner as in Example 1 except that these expandable composite resin beads were expanded by 30-fold.

Example 15

In this example, an expandable composite resin bead was produced in the same manner as in Example 1 except that the nuclear bead C was used as the nuclear beads and that a mixed monomer of 65 g of styrene and 15 g of butyl acrylate was used as the first monomer. Subsequently, these expandable composite resin beads were expanded by 50-fold to prepare primarily expanded beads. Then, after aging the primarily expanded beads at room temperature for 1 day, the resultant beads were filled in a 30 L ordinary-pressure batch expander. Thereafter, the primarily expanded beads were expanded by 95-fold by supplying steam into the expander to produce composite resin expanded beads, and a foamed resin molded article was produced in the same manner as in Example 1 except that the thus obtained composite resin expanded beads were used.

Example 16

In this example, an expandable composite resin bead was produced in the same manner as in Example 1 except that the nuclear bead C was used as the nuclear beads and that a mixed monomer of 65 g of styrene and 15 g of butyl acrylate was used as the first monomer. Subsequently, these expandable composite resin beads were expanded by 50-fold to prepare primarily expanded beads. Then, after aging the primarily expanded beads at room temperature for 1 day, the resultant beads were filled in a 30 L ordinary-pressure batch expander. Thereafter, the primarily expanded beads were expanded by 95-fold by supplying steam into the expander to prepare secondarily expanded beads. Then, after aging the secondarily expanded beads at room temperature for 1 day, the resultant beads were filled in a 30 L ordinary-pressure batch expander. Thereafter, the secondarily expanded beads were expanded by 135-fold by supplying steam into the expander to produce composite resin expanded beads, and a foamed resin molded article was produced in the same manner as in Example 1 except that the thus obtained composite resin expanded beads were used.

Comparative Example 1

First, a magnesium pyrophosphate slurry to be used as a suspension agent was prepared in the same manner as in Example 1. Then, 1.25 g of sodium lauryl sulfate (10 mass % aqueous solution) used as a surfactant and 150 g of the nuclear beads (the nuclear bead A) were charged to the suspension agent contained in an autoclave, followed by stirring at a stirring rate of 500 rpm.

Subsequently, after replacing the air inside the autoclave with nitrogen, the inside temperature of the autoclave was started to increase, and was increased up to 60° C. over 30 minutes, and the temperature of 60° C. was kept for 40 minutes. Besides, 0.25 g of dicumyl peroxide ("PERCUMYL D" manufactured by NOF Corporation) used as a polymerization initiator was dissolved in 65 g of styrene used as a first monomer, and the resultant was added to the autoclave over 30 minutes when the temperature of 60° C. was reached as described above. Subsequently, the temperature within the autoclave was increased up to 130° C. over 1 hour and 30 minutes, and the temperature of 130° C. was kept for 2 hours. Thereafter, the autoclave was cooled to a temperature of 120° C. over 30 minutes. After cooling, the temperature of 120° C. was kept for 3 hours and 30 minutes.

Figure 4:
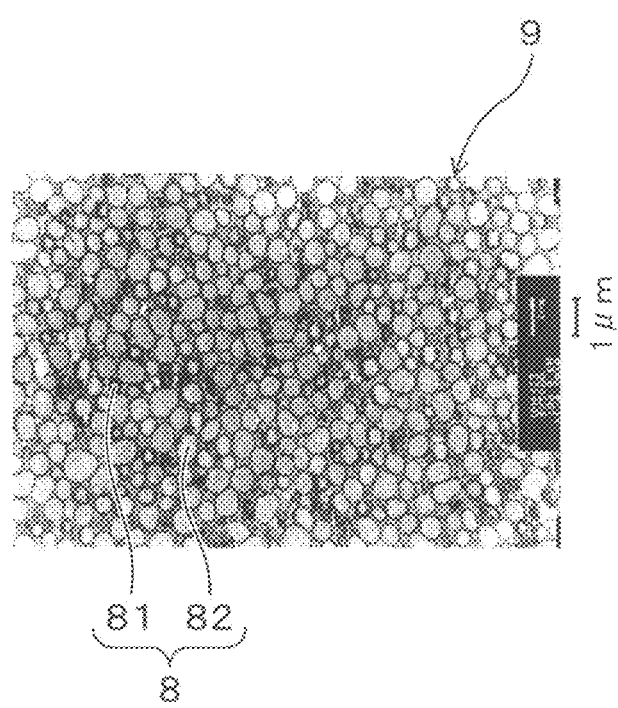
FIG. 4 shows a transmission electron micrograph in a cross section of a central part of an expandable composite resin bead according to Comparative Example 1.

Besides, 0.75 g of dicumyl peroxide ("PERCUMYL D" manufactured by NOF Corporation) used as a polymerization initiator was dissolved in 285.5 g of styrene used as a second monomer, and the resultant was added to the autoclave over 2 hours and 30 minutes when the temperature of 120° C. was reached as described above. Thereafter, expandable composite resin beads were produced by performing similar processing to that of Example 1. A transmission electron micrograph (with magnification of 10000×) of a cross section of the center part of the expandable composite resin bead 9 obtained in this comparative example is shown in FIG. 4. As illustrated in FIG. 4, a composite resin 8 had a continuous phase 81 of the PP resin and a dispersed phase 82 of the PS resin dispersed in the continuous phase 81 also in the expandable composite resin bead 9 of this comparative example.

Next, the expandable composite resin beads of this comparative example were expanded in the same manner as in Example 1, but the expandable composite resin beads of this comparative example could not be expanded up to 50-fold.

Comparative Example 2

In this comparative example, an expandable composite resin bead was produced in the same manner as in Example 1 except that the amount of the nuclear beads to be charged was changed to 150 g, that a mixed monomer of 160 g of styrene and 15 g of butyl acrylate was used as the first monomer, and that 175 g of styrene was used as the second monomer. Subsequently, the expandable composite resin beads were expanded by 30-fold to prepare primarily expanded beads. Then, the primarily expanded beads were aged at room temperature for 1 day, and the resultant beads were filled in a 30 L ordinary-pressure batch expander. Thereafter, the primarily expanded beads were expanded 50-fold by supplying steam into the expander to produce a composite resin expanded beads, and a foamed resin molded article was produced in the same manner as in Example 1 except that these composite resin expanded beads were used.

Comparative Example 3

In this comparative example, an expandable composite resin bead, a composite resin expanded bead and a foamed resin molded article were produced in the same manner as in Example 1 except that the amount of the nuclear beads added was changed to 15 g, that 15 g of styrene was used as the first monomer, and that 470 g of styrene was used as the second monomer.

Comparative Example 4

In this comparative example, an expandable composite resin bead, a composite resin expanded bead and a foamed resin molded article were produced in the same manner as in Example 1 except that the nuclear bead C was used as the nuclear beads, that a mixed monomer of 22.5 g of styrene and 15 g of butyl acrylate was used as the first monomer, and that 387.5 g of styrene was used as the second monomer.

Comparative Example 5

In this comparative example, an expandable composite resin bead, a composite resin expanded bead and a foamed resin molded article were produced in the same manner as in Example 1 except that the nuclear bead C was used as the nuclear beads, that a mixed monomer of 360 g of styrene and 15 g of butyl acrylate was used as the first monomer, and that 50 g of styrene was used as the second monomer.

Results of Examples and Comparative Examples

Similarly to Example 1, the polymerization conditions of the expandable composite resin beads produced in Examples 2 to 16 and Comparative Examples 1 to 5 are shown in Tables 2 and 3 below. Besides, each of the obtained expandable composite resin beads was examined in the same manner as in Example 1 to obtain the absorbance ratio A of the acetone solubles, the absorbance ratio R of the composite resin, the ratio therebetween (the absorbance ratio A/absorbance ratio R), the weight average molecular weight (Mw) of the PS resin, the glass transition temperature (Tg) of the PS resin, the average particle diameter of the dispersed phase, and the beads-life. The results are shown in Tables 2 and 3 below. It is noted that the composite resin had a continuous phase of the PP resin and a dispersed phase of the PS resin dispersed in the continuous phase in the expandable composite resin bead of any of these examples and comparative examples.

Besides, each of the foamed resin molded articles produced in Examples 2 to 16 and Comparative Examples 1 to 5 was examined in the same manner as in Example 1 to obtain the molding pressure (MPa(G)), the apparent density (kg/m$^3$), the 50% compressive stress (kPa), the compression set (%), the closed cell rates (%) before and after the compression set test, and the ratio between the closed cell rates before and after the compression set test (i.e., the closed cell rate after the compression set test/the closed cell rate before the compression set test). The results are shown in Tables 2 and 3.

TABLE 1

| Type of nuclear bead | PP resin Product name | Tm (° C.) | Dispersion diameter enlarging agent |
|---|---|---|---|
| Nuclear bead A | F-794NV | 133 | — |
| Nuclear bead B | WFX4TA | 125 | — |
| Nuclear bead C | WFX4TA | 125 | AS-XGS |
| Nuclear bead D | FL331G5 | 138 | — |

TABLE 2

| | | Example No. | | 1 | 2 | 3 | 4 | 5 | 6 | 7 | 8 |
|---|---|---|---|---|---|---|---|---|---|---|---|
| Polymerization condition | | Nuclear bead | type | A | B | C | D | | A | | C |
| | Styrene monomer | First monomer*[1] | parts by mass | 107 | 112 | 107 | 111 | 107 | 140 | 112 | |
| | | Second monomer*[1] | parts by mass | 460 | 483 | 460 | 316 | 460 | 1760 | 483 | |
| | | Total added amount*[1] | parts by mass | 567 | 595 | 567 | 427 | 567 | 1900 | 595 | |
| | | Seed ratio (First monomer/PP resin) | — | 1.07 | 1.12 | 1.07 | 1.11 | 1.07 | 1.40 | 1.12 | |
| | | Amount of BA *[2] | parts by mass | | | | | 3 | 3 | 3 | 1 |
| | | Amount of polymerization initiator*[3] | parts by mass | | | | | 0.2 | | | |
| Expandable composite resin bead | | Absorbance ratio A ($D_{698}/D_{1376}$) | — | 14.7 | 13.6 | 13.6 | 16.5 | 15.0 | 12.7 | 19.0 | 13.4 |
| | | Absorbance ratio R ($D_{698}/D_{1376}$) | — | 11.2 | 11.2 | 11.6 | 11.2 | 9.5 | 11.2 | 14.2 | 11.6 |
| | | Absorbance ratio A/ Absorbance ratio R | — | 1.3 | 1.2 | 1.2 | 1.5 | 1.6 | 1.1 | 1.3 | 1.2 |
| | | Mw of PS resin | ×10$^4$ | 71 | 43 | 43 | 40 | 36 | 31 | 30 | 41 |
| | | Tg of PS resin | ° C. | 105 | 105 | 105 | 105 | 98 | 98 | 99 | 103 |

TABLE 2-continued

|  |  | | | | | | | | |
|---|---|---|---|---|---|---|---|---|---|
|  | Average particle diameter of dispersed phase | μm | 0.38 | 0.40 | 0.55 | 0.40 | 0.31 | 0.38 | 0.55 | 0.55 |
|  | Beads-life (by 50-fold) | days | 0.3 | 0.3 | 0.4 | 0.2 | 0.2 | 0.6 | 10 | 0.8 |
| Foamed resin molded article | Molding pressure | MPa(G) | 0.20 | 0.16 | 0.16 | 0.24 | 0.17 | 0.16 | 0.16 | 0.14 |
|  | Apparent density | kg/m³ | 20 | 20 | 20 | 20 | 20 | 20 | 20 | 20 |
|  | 50%-compressive stress | kPa | 260 | 255 | 260 | 250 | 250 | 255 | 240 | 255 |
|  | Compression set | % | 2.8 | 3.2 | 2.8 | 5.0 | 4.0 | 3.7 | 9.0 | 3.4 |
|  | Closed cell rate (before test) | % | 91 | 91 | 91 | 87 | 89 | 90 | 87 | 91 |
|  | Closed cell rate (after test) | % | 88 | 89 | 89 | 81 | 86 | 97 | 80 | 86 |
|  | Ratio of closed cell rates (after test/before test) | — | 0.96 | 0.98 | 0.97 | 0.93 | 0.96 | 1.08 | 0.92 | 0.95 |

| | | Example No. | 9 | 10 | 11 | 12 | 13 | 14 | 15 | 16 |
|---|---|---|---|---|---|---|---|---|---|---|
| Polymerization condition | | Nuclear bead | type | | | | C | | | | |
|  | Styrene monomer | First monomer*1 | parts by mass | | 112 | | | 263 | | 112 | |
|  |  | Second monomer*1 | parts by mass | | 483 | | | 333 | | 483 | |
|  |  | Total added amount*1 | parts by mass | | | | 595 | | | | |
|  |  | Seed ratio (First monomer/PP resin) | — | | 1.12 | | | 2.63 | | 1.12 | |
|  |  | Amount of BA *2 | parts by mass | 3 | 5 | | | 3 | | | |
|  |  | Amount of polymerization initiator*3 | parts by mass | 0.2 | | 0.5 | 1 | | 0.2 | | |
| Expandable composite resin bead | | Absorbance ratio A ($D_{698}/D_{1376}$) | — | 13.6 | 13.5 | 18.0 | 22.0 | 21.0 | 13.6 | 13.6 | 13.6 |
|  |  | Absorbance ratio R($D_{698}/D_{1376}$) | — | 11.6 | 11.6 | 11.6 | 11.6 | 11.6 | 11.6 | 11.6 | 11.6 |
|  |  | Absorbance ratio A/Absorbance ratio R | — | 1.2 | 1.2 | 1.6 | 1.9 | 1.8 | 1.2 | 1.2 | 1.2 |
|  |  | Mw of PS resin | ×10⁴ | 34 | 30 | 22 | 19 | 32 | 34 | 34 | 34 |
|  |  | Tg of PS resin | °C. | 98 | 90 | 98 | 98 | 98 | 98 | 98 | 98 |
|  |  | Average particle diameter of dispersed phase | μm | 0.55 | 0.55 | 0.55 | 0.55 | 0.55 | 0.55 | 0.55 | 0.55 |
|  |  | Beads-life (by 50-fold) | days | 2 | 0.8 | 1.5 | 1 | 1.5 | 2 | 2 | 2 |
| Foamed resin molded article |  | Molding pressure | MPa(G) | 0.12 | 0.12 | 0.14 | 0.16 | 0.12 | 0.12 | 0.12 | 0.12 |
|  |  | Apparent density | kg/m³ | 20 | 20 | 20 | 20 | 20 | 33 | 11 | 7 |
|  |  | 50%-compressive stress | kPa | 255 | 230 | 255 | 235 | 250 | 395 | 170 | 140 |
|  |  | Compression set | % | 4.6 | 9.6 | 5.9 | 9.5 | 9.0 | 3.8 | 2.3 | 2.3 |
|  |  | Closed cell rate (before test) | % | 90 | 86 | 89 | 86 | 86 | 90 | 90 | 89 |
|  |  | Closed cell rate (after test) | % | 87 | 73 | 84 | 71 | 72 | 86 | 87 | 86 |
|  |  | Ratio of closed cell rates (after test/before test) | — | 0.97 | 0.85 | 0.94 | 0.82 | 0.84 | 0.96 | 0.98 | 0.97 |

First monomer*1, Second monomer*1 and Total added amount*1 shown in the table are he amounts with respect to 100 parts by mass of a PP resin in a nuclear bead. Amount of BA*2 and Amount of polymerization initiator*3 shown in the table are the amounts with respect to 100 parts by mass of the total of a nuclear bead and a styrene monomer.

TABLE 3

| | | Comparative Example No. | | 1 | 2 | 3 | 4 | 5 |
|---|---|---|---|---|---|---|---|---|
| Polymerization condition | | Nuclear bead | type | | A | | C | |
|  | Styrene monomer | First monomer*1 | parts by mass | 43 | 117 | 100 | 53 | 525 |
|  |  | Second monomer*1 | parts by mass | 190 | 117 | 3133 | 543 | 70 |
|  |  | Total added amount*1 | parts by mass | 233 | | 3233 | 595 | |
|  |  | Seed ratio (First monomer/PP resin) | — | 0.43 | 1.17 | 1.00 | 0.53 | 5.25 |
|  |  | Amount of BA*2 | parts by mass | — | 3 | — | 3 | |
|  |  | Amount of polymerization initiator*3 | parts by mass | | | 0.2 | | |
| Expandable composite resin bead | | Absorbance ratio A ($D_{698}/D_{1376}$) | — | — | 25.0 | 24.3 | 24.0 | 24.0 | 23.5 |
|  |  | Absorbance ratio R ($D_{698}/D_{1376}$) | — | — | 5.1 | 5.1 | 18.9 | 11.6 | 11.6 |
|  |  | Absorbance ratio A/Absorbance ratio R | — | — | 4.9 | 4.8 | 1.3 | 2.1 | 2.0 |
|  |  | Mw of PS resin | ×10⁴ | | 39 | 41 | 27 | 38 | 30 |
|  |  | Tg of PS resin | °C. | | 105 | 97 | 99 | 99 | 98 |
|  |  | Average particle diameter of dispersed phase | μm | | 0.23 | 0.23 | 0.47 | 0.55 | 0.55 |
|  |  | Beads-life (by 50-fold) | days | — | 0.01 | 20 | 0.08 | 0.5 |
| Foamed resin molded article |  | Molding pressure | MPa (G) | Not expanded up to 50-fold | 0.2 | 0.14 | 0.14 | 0.12 |
|  |  | Apparent density | kg/m³ | | 20 | 20 | 20 | 20 |
|  |  | 50%-compressive stress | kPa | | 230 | 200 | 235 | 230 |
|  |  | Compression set | % | | 13 | 20 | 17 | 14 |
|  |  | Closed cell rate (before test) | % | | 89 | 85 | 88 | 86 |
|  |  | Closed cell rate (after test) | % | | 86 | 60 | 66 | 72 |
|  |  | Ratio of closed cell rates (after test/before test) | — | | 0.96 | 0.71 | 0.74 | 0.84 |

First monomer*1, Second monomer*1 and Total added amount*1 shown in the table are the amounts with respect to 100 parts by mass of a PP resin in a nuclear bead. Amount of BA*2 and Amount of polymerization initiator*3 shown in the table are the amounts with respect to 100 parts by mass of the total of a nuclear bead and a styrene monomer.

As understood from Tables 2 and 3, an expandable composite resin bead excellent in the blowing agent retainability and the expandability could be obtained by adjusting the mixing ratio between the PP resin and the styrene monomer and the absorbance ratio A ($D_{698}/D_{1376}$) of the acetone solubles to fall in the prescribed ranges. Specifically, the expandable composite resin beads of the examples, which contain a base resin composed of a composite resin obtained by polymerizing, in a PP resin, more than 400 parts by mass and 1900 parts by mass or less of a styrene monomer with respect to 100 parts by mass of the PP resin and in which the absorbance ratio A ($D_{698}/D_{1376}$) was 8.5 to 23, were excellent in the blowing agent retainability and the expandability. Besides, the foamed resin molded articles obtained by using these expandable composite resin beads had both high rigidity and high restorability.

On the contrary, in each of the comparative examples, in which the mixing ratio between the PP resin and the styrene monomer was out of the aforementioned range or in which the absorbance ratio A did not fall in the prescribed range, the expandability of the resultant expandable composite resin bead was insufficient (as in Comparative Examples 1, 2 and 4) or the restorability of the foamed resin molded article obtained by using the expandable composite resin bead was insufficient (as in Comparative Examples 2 to 4).

REFERENCE SIGNS LIST 1 expandable composite resin bead
2 composite resin
21 continuous phase
22 dispersed phase

What is claimed is:

1. An expandable composite resin bead, comprising:
   a base resin comprising a composite resin obtained by polymerizing from 500 parts by mass to 700 parts by mass of a styrene monomer in 100 parts by mass of a polypropylene resin; and
   an organic physical blowing agent, wherein,
   when xylene solubles of the expandable composite resin bead are obtained by Soxhlet extraction using a xylene solvent, and
   acetone solubles in the xylene solubles are obtained by dissolving the xylene solubles into acetone,
   the acetone solubles have an absorbance ratio A ($D_{698}/D_{1376}$) of from 8.5 to 23, where $D_{698}$ of the absorbance ratio A is an absorbance of the acetone solubles measured at a wavenumber of 698 cm$^{-1}$ of infrared absorption spectra of the acetone solubles, and $D_{1376}$ of the absorbance ratio A is an absorbance of the acetone solubles measured at a wavenumber of 1376 cm$^{-1}$ of the infrared absorption spectra of the acetone solubles.

2. The expandable composite resin bead according to claim 1, wherein a ratio of the absorbance ratio A ($D_{698}/D_{1376}$) to an absorbance ratio R ($D_{698}/D_{1376}$) is 1 or more and less than 2, where $D_{698}$ of the absorbance ratio R is an absorbance of the composite resin measured at a wavenumber of 698 cm$^{-1}$ of infrared absorption spectra of the composite resin, and $D_{1376}$ of the absorbance ratio R is an absorbance of the composite resin measured at a wavenumber of 1376 cm$^{-1}$ of the infrared absorption spectra of the composite resin.

3. The expandable composite resin bead according to claim 1, wherein the styrene monomer comprises 80% by mass or more of styrene, a styrene derivative, or both, and the styrene derivative is at least one selected from the group consisting of α-methylstyrene, o-methylstyrene, m-methylstyrene, p-methylstyrene, p-ethylstyrene, 2,4-dimethylstyrene, p-methoxystyrene, p-n-butylstyrene, p-t-butylstyrene, o-chlorostyrene, m-chlorostyrene, p-chlorostyrene, 2,4,6-tribromostyrene, divinylbenzene, styrene sulfonic acid, and sodium styrenesulfonate.

4. The expandable composite resin bead according to claim 1, wherein the absorbance ratio A ($D_{698}/D_{1376}$) from 12 to 18.

5. The expandable composite resin bead according to claim 1, wherein the organic physical blowing agent is at least one selected from the group consisting of a saturated hydrocarbon compound having 3 to 6 carbon atoms, a lower alcohol having 5 or less carbon atoms, and an ether compound having 6 or less carbon atoms.

6. The expandable composite resin bead according to claim 1, wherein the organic physical blowing agent is at least one selected from the group consisting of propane, n-butane, isobutane, cyclobutane, n-pentane, isopentane, neopentane, cyclopentane, n-hexane, and cyclohexane.

7. The expandable composite resin bead according to claim 1, wherein the organic physical blowing agent is included in an amount of from 3% by mass to 10% by mass.

8. The expandable composite resin bead according to claim 1, wherein the polypropylene resin is at least one selected from the group consisting of a propylene homopolymer, a propylene-ethylene random copolymer, a propylene-ethylene block copolymer, a propylene-butene random copolymer, a propylene-butene block copolymer, and a propylene-ethylene-butene random copolymer.

9. The expandable composite resin bead according to claim 1, wherein the polypropylene resin has a melting point of from 115 to 140° C.

10. The expandable composite resin bead according to claim 1, wherein the absorbance ratio A ($D_{698}/D_{1376}$) is from 10 to 18.

11. An expanded composite resin bead, produced by a process comprising expanding the expandable composite resin bead of claim 1.

12. A molded article, produced by a process comprising fusion-bonding a plurality of the expanded composite resin beads of claim 11.

13. The expandable composite resin bead according to claim 1, wherein the styrene monomer comprises styrene and optionally an acrylate.

14. The expandable composite resin bead according to claim 1, wherein the styrene monomer comprises styrene and an acrylate.

15. The expandable composite resin bead according to claim 14, wherein the acrylate is butyl acrylate.

16. The expandable composite resin bead according to claim 1, wherein the composite resin is obtained by polymerizing the styrene monomer in a nuclear bead comprising the polypropylene resin.

17. The expandable composite resin bead according to claim 16, wherein the organic physical blowing agent is impregnated in the base resin.

18. The expandable composite resin bead according to claim 16, wherein the nuclear bead has a particle diameter of from 0.1 mm to 3.0 mm.

19. The expandable composite resin bead according to claim 1, wherein the absorbance ratio A ($D_{698}/D_{1376}$) is from 12 to 15.

20. The expandable composite resin bead according to claim 2, wherein the ratio of the absorbance ratio A ($D_{698}/D_{1376}$) to the absorbance ratio R ($D_{698}/D_{1376}$) is from 1.1 to 1.5.

* * * * *